May 16, 1939.  H. C. HORSTMANN, JR  2,158,541
CORN CUTTER
Filed Feb. 2, 1938

INVENTOR.
HERMAN C. HORSTMANN Jr.
BY J. Ledermann
ATTORNEY.

Patented May 16, 1939

2,158,541

UNITED STATES PATENT OFFICE 2,158,541

CORN CUTTER

Herman C. Horstmann, Jr., Cloverdale, Ohio

Application February 2, 1938, Serial No. 188,260

2 Claims. (Cl. 56—15)

This invention relates to farm machinery, more particularly to corn cutting machines, and aims to provide a self-propelled corn cutting machine having angularly positioned blades on the forward sides thereof which are adapted to cut down two adjacent rows of corn stalks at the same time.

Another object is to provide such a machine having additional features which will be hereinafter set forth, which is relatively inexpensive in cost of construction and operation, and which is both a time and labor saving machine.

The above and other objects will become apparent in the description below, in which characters of reference refer to like-numbered parts in the accompanying drawing, forming a part hereof.

Referring briefly to the drawing, Figure 1 is a plan view of the machine.

Figure 1:
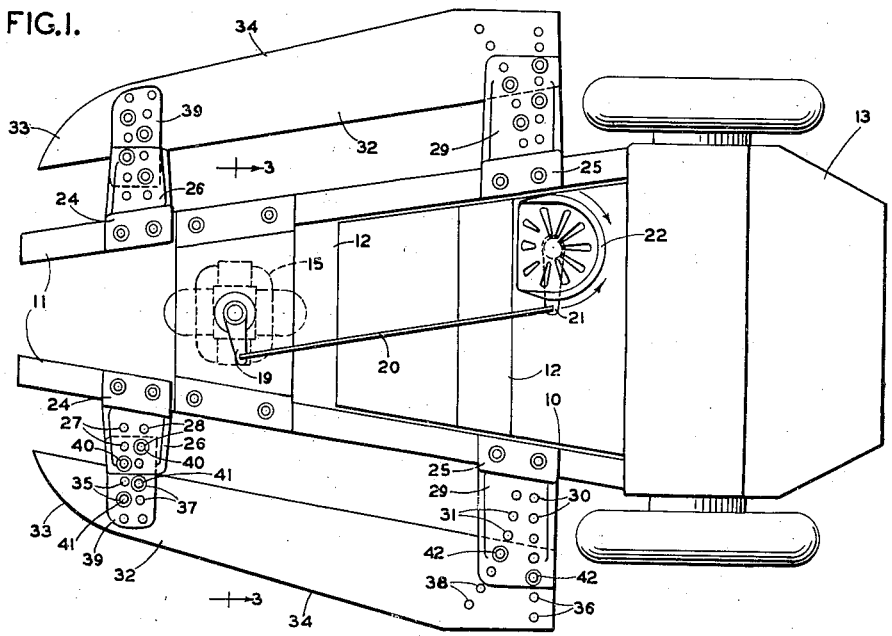
Figure 2:
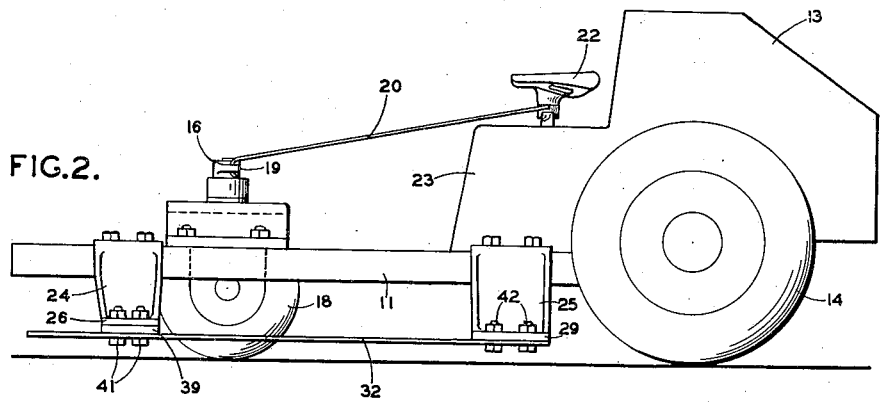
Figure 2 is a side elevational view of the same.
Figure 3:
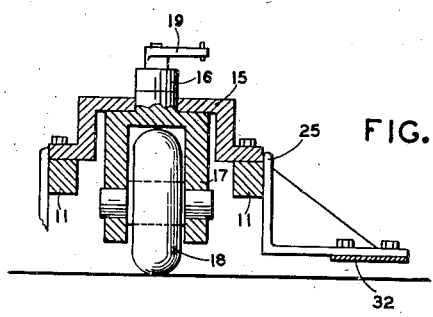
Figure 3 is a cross-sectional view taken on the line 3—3 of Figure 2.

Referring in detail to the drawing, the numeral 10 represents the chassis generally, comprising essentially a pair of beams 11 mounted at an acute angle to each other and joined by ties 12. A housing 13, mounted between the rear traction wheels 14, contains the engine, gas tank, etc., (not shown), in other words, all of the essential parts of an automotive vehicle.

A plate 13 is mounted between the forward ends of the beams 11, and a steering pin 16 rotatably projects therethrough. Within the fork 17 below the plate 15 a single dirigible front wheel 18 is mounted. A crank 19 extends from the top of the pin 16, and a link 20 joins the crank 19 with a crank 21 extending from the driver's seat 22, the latter being rotatably mounted on the forward portion 23 of the housing 13. That portion of the top of the portion 23 of the housing 13 also serves as an additional seat for a passenger. It is apparent that the machine may be steered by the driver by his simply turning his seat from side to side.

On each of the beams 11, one forward and the other rearward, a pair of downward and outwardly extending right-angled brackets 24 and 25, respectively, are secured to the beam. The lower, horizontal arm 26 of the forward bracket 24 is provided with a series of holes 27 therethrough arranged in a straight line, and a second series of similar holes 28 arranged in an arc. The lower horizontal arm 29 of the rear bracket 25 is similarly provided with a series of holes 30 arranged in straight line and a second series of holes 31 arranged in an arc. The straight lines of the series 27 and 30 are parallel, and the arcs of the series 28 and 31 are parts of the circumference of an imaginary circle having its center at a point located between the arcs. The removable blade 32, having the sharpened nose 33 and the cutting edge 34, is similarly provided with straight lines of holes 35 and 36 and arcuate lines 37 and 48. When mounted, as shown, the arcs 37 and 38 are continuations of the arcs 28 and 31, respectively, and the straight lines 35 and 36 are continuations of the straight lines 27 and 30. Since the forward end of the blade 32 is narrower than the rearward end and since it is subject to swinging through a wider arc than the latter, an auxiliary plate 39 is mounted between the blade 32 and the arm 26 of the forward bracket 24. This plate is provided with both a straight line of holes adapted to align with the straight lines of holes 27—35, and is also provided with an arcuate line of holes adapted to align with the arcuate lines of holes 28—37. Suitable nuts and bolts 40 are provided to secure the plate 39 to the underside of the arm 26, and additional bolts 41 to secure the blade 32 to the plate 39. Likewise, bolts and nuts 42 are provided to secure the rear end of the blade 32 to the underside of the rear bracket 25.

If it is desired to move the blades 32 inward toward the chassis 10, the bolts just mentioned are first removed and the blades moved to their new positions and the bolts reinserted through the newly aligned holes of the straight line series 27—35 and 30—36. If, however, it is desired to change the angle of the blades 32 with respect to the chasis beams 11, in other words, to vary the width of the nose formed by the cooperating blade noses 33, which may be advisable because of the varying distance between adjacent rows of corn, then, after removing the bolts, the blades are swung about the center point of the circle mentioned, and the bolts reinserted through the newly aligned arcuate holes. It is to be noted that in the position shown in Figure 1, both straight and arcuate series of holes are in alignment but as soon as the blades are moved to any other position above-mentioned only one of the sets of series, that is, either the straight line series or the arcuate series will be in alignment. Since only two bolts are required on either member for secure attachment at any time, in each position two bolts pass through the blade and plate 39 and two bolts through the arm 26 and the plate 39, at the front.

In case the machine is to be used where no adjustment of the blades is ever required, the blades may be simply locked in the position shown, or they might be simply and permanently secured to the brackets. Obviously, other modifications in form and structure may be made without departing from the spirit and scope of the invention.

I claim:

1. In a dirigible machine having a chassis adapted to be propelled forward, a pair of blades mounted on the sides of the chassis, said blades inclining toward each other in a forward direction, a dirigible wheel mounted in the forward part of the chassis, a driver's seat rotatably mounted on the chassis, and means for turning said wheel secured to said seat.

2. In a machine having a chassis adapted to be propelled forward, a pair of downwardly and outwardly extending brackets secured to each side of the chassis, each of said brackets having a series of holes aligned in a straight line therethrough each bracket, each of said brackets having a second series of holes aligned in an arc therethrough, the arcuate series of holes through the brackets on each side of the chassis forming arcs of a common imaginary circle, a blade adapted to be secured to the brackets on each side of the chassis, said blade having similar straight line and arcuate series of holes adapted to be aligned with said straight line and arcuate series respectively, of said brackets, and bolts adapted to pass through said holes to lock said blades against said brackets, said series of straight lines and arcuate holes on said brackets and blades, and said bolts, serving to permit variation of the angular positions of said blades with respect to each other.

HERMAN C. HORSTMANN, Jr.